(12) United States Patent
Plötz

(10) Patent No.: US 6,412,154 B1
(45) Date of Patent: Jul. 2, 2002

(54) HYDRODYNAMICALLY BOUNDED CARRIER WEBS AND USE THEREOF

(75) Inventor: Kurt Plötz, Waldems (DE)

(73) Assignee: Johns Manville International, Inc., Denver, CO (US)

(*) Notice: Subject to any disclaimer, the term of this patent is extended or adjusted under 35 U.S.C. 154(b) by 9 days.

(21) Appl. No.: 09/619,528

(22) Filed: Jul. 19, 2000

(30) Foreign Application Priority Data

| Jul. 30, 1999 | (DE) | 199 35 408 |
| Jul. 30, 1999 | (DE) | 199 35 531 |
| Oct. 16, 1999 | (DE) | 199 50 057 |
| Oct. 30, 1999 | (DE) | 199 52 432 |
| Nov. 18, 1999 | (DE) | 199 55 713 |
| Nov. 18, 1999 | (DE) | 199 55 730 |

(51) Int. Cl.$^7$ .................................. D04H 1/48
(52) U.S. Cl. .................. 28/104; 156/148; 442/387
(58) Field of Search .................. 28/103, 104, 105, 28/106, 165, 166, 167; 156/62.2, 62.6, 62.8, 148, 60, 324; 428/426, 430, 435; 442/381, 384, 387, 388, 408, 415, 416

(56) References Cited

U.S. PATENT DOCUMENTS

| 3,044,146 A | * | 7/1962 | Thomas et al. ........... 28/107 |
| 3,718,954 A | * | 3/1973 | Philipps .................... 28/105 |
| 4,230,762 A |   | 10/1980 | Iwaski et al. |
| 4,612,237 A | * | 9/1986 | Frankenburg ........... 28/104 |
| 4,755,423 A |   | 7/1988 | Greiser et al. |
| 5,017,426 A |   | 5/1991 | Greiser et al. |
| 5,174,228 A | * | 12/1992 | Grimnes ................... 112/2 |
| 5,301,400 A | * | 4/1994 | Boulanger ............... 28/105 |
| 5,458,960 A |   | 10/1995 | Nieminen et al. |
| 5,616,395 A | * | 4/1997 | Baravian et al. ........ 156/148 |
| 5,806,155 A | * | 9/1998 | Malaney et al. ......... 28/104 |
| 5,885,390 A | * | 3/1999 | Alkire et al. ............ 156/148 |
| 6,108,879 A | * | 8/2000 | Forte et al. .............. 28/104 |

FOREIGN PATENT DOCUMENTS

| DE | 26 22 206 | 12/1977 |
| DE | 3435 643 A1 | 4/1986 |
| DE | 36 05 830 A1 | 8/1987 |
| DE | 3901 152 A1 | 7/1990 |
| DE | 6 92 07 367.0 | 10/1992 |
| DE | 43 39 709 A1 | 5/1995 |
| DE | 195 21 838 A1 | 12/1996 |
| DE | 195 43 991 A1 | 5/1997 |
| DE | 197 39 049 A1 | 3/1999 |
| EP | 0 132 325 B1 | 1/1985 |
| EP | 0 176 847 A2 | 4/1986 |
| EP | 0 185 169 A2 | 6/1986 |
| EP | 0 187 824 B1 | 7/1986 |
| EP | 0 226 471 A3 | 6/1987 |
| EP | 0 226 471 A2 | 6/1987 |
| EP | 0 242 524 A2 | 10/1987 |
| EP | 0 285 533 B1 | 10/1988 |
| EP | 0 315 507 A2 | 5/1989 |
| EP | 0 379 100 B1 | 7/1990 |
| EP | 0 403 403 A1 | 12/1990 |
| EP | 0 603 633 A1 | 6/1994 |
| EP | 0 646 454 A1 | 4/1995 |
| EP | 0 667 427 A1 | 8/1995 |
| EP | 08246358 | 9/1996 |
| EP | 0 806 509 A1 | 11/1997 |
| EP | 0 899 372 A2 | 3/1999 |
| EP | 0 900 869 A2 | 3/1999 |
| JP | 0010246453 AA | 10/1989 |
| JP | 0070052299 AA | 2/1995 |
| JP | 11-268159 | 1/1999 |
| WO | WO 90/15181 | 12/1990 |
| WO | WO 97/19219 | 5/1997 |
| WO | WO 98/17455 | 4/1998 |

\* cited by examiner

*Primary Examiner*—Amy B. Vanatta
(74) *Attorney, Agent, or Firm*—Burns, Doane, Swecker & Mathis LLP

(57) ABSTRACT

The present invention provides a method for the production of bounded non-wovens carriers. The method includes providing a glass staple fiber containing non-woven which is pre-consolidated with a binder. The glass staple fiber non-woven is placed adjacent to one or more non-wovens of synthetic fibers and hydro-dynamically needling at a water beam pressure in the range of 100 to 400 bar.

18 Claims, No Drawings

HYDRODYNAMICALLY BOUNDED CARRIER WEBS AND USE THEREOF

BACKGROUND OF THE INVENTION

1. Field of the Invention

This invention relates to hydro-dynamically bounded carrier webs, a production and use thereof.

2. Description of the Related Art

Laminated carriers (i.e., composites) manufactured from non-wovens are useful in a number of construction applications such as roofing membranes, bituminized roofing webs, insulation, etc. These carriers include textile fabrics such as non-wovens which have been consolidated, impregnated in a bitumen bath and optionally coated thereafter with bitumen.

Various laminates fabricated from a non-woven synthetic materials and non-woven mineral materials are known in the industry. For example, DE 197 39 049 A 1 discloses a process, wherein continuous filaments are laid on an endless sieve directly after their formation in order to produce a non-woven of uniform thickness. Hydrodynamic needling then takes place in order to produce a high strength non-woven. The needled non-woven containing continuous fibers is preferably fixed before being coated with bitumen. The hydraulically needled continuous filament non-woven prior to coating with bitumen, a glass fiber non-woven can be provided or bound thereon.

European Patent Document EP 0 285 533 B1 discloses a composite consisting of a non-woven fiber web combined with a textile grid in which the fiber webs are non-wovens made of staple fibers. The staple fibers may be based on polyester fibers or glass fibers. The interlocking of the non-wovens and the textile grid is obtained by hydraulic needling.

European Patent Document EPO 315 553 B1 also discloses composites based on non-wovens, which are bound to one another by hydraulic needling. The upper layer, (i.e., the upper non-woven) consists of staple fibers, the layer underneath is also a non-woven and consists of relatively rigid and brittle fibers such as glass, asbestos, etc. Further, this document discloses that it is essential that during the needling process the fibers of the upper first non-woven penetrate into the second non-woven but do not protrude through the surface of the second non-woven.

Finally, European Patent Document EP 403 403 B1 describes a further development of the subject matter of EP 0 315 553 B1. The fibers of the non-woven consisting of stiff inorganic fibers are essentially arranged parallel to the sheet surface. Such non-wovens are for instance produced during a wet process which is usually employed in the production of paper. Thus, the document proposes providing inorganic fiber non-wovens with perforations prior to the binding with the synthetic fiber non-woven in order for synthetic fibers to better penetrate the non-woven made of inorganic fibers.

Although numerous processes are known for the production of carrier webs which can serve as carriers for bituminized roofing felts, a need for improved carriers (i.e., having improved mechanical strength, fire retardant properties, etc.) and processes for the production thereof, in a fast and facile manner remains.

To meet the requirements of the roofing, sealing, flooring and insulating industries and to overcome the disadvantages of the related art, it is an object of the present invention to provide a method for the production of bounded non-woven carriers wherein the non-woven are hydro-dynamically needled, thus minimizing the need to employ a binder for final consolidation.

It is a further object of the invention, to provide carrier webs with special property profiles that may be adjusted to meet the special purposes for which it is used.

It is another object of the invention, to provide a non-woven laminate having improved dimensional stability as well as improved stability during the end step (e.g., bitumization step).

It is yet another object of the invention, to provide a non-woven laminate composite having improved delamination resistance, wherein the laminate is compatible with coating and impregnation materials.

It is a further object of the invention, to provide a laminate having improved perforation stability and tear propagation resistance, as well as improved fire behavior after being coated or impregnated.

It is another object of the invention, to provide a laminate having a particular density and thus, having a desired thickness.

Other objects and aspects of the invention will become apparent to one of ordinary skill in the art upon review of the specification and claims appended hereto.

SUMMARY OF THE INVENTION

In accordance with the inventive non-woven laminate composite and method of production thereof, it has been determined that a laminate of two or more layers hydro-dynamically consolidated does not require a binder, or at the very least it is minimized.

In accordance to one aspect of the invention, a method for the production of bounded non-wovens carriers is provided. The method includes providing a glass staple fiber containing non-woven which is pre-consolidated with a binder, placing the glass staple fiber containing non-woven adjacent to one or-more non-wovens of synthetic fibers and hydro-dynamically needling the adjacent non-wovens at a water beam pressure in the range of 100 to 400 bar.

DETAILED DESCRIPTION OF THE PREFERRED EMBODIMENTS OF THE INVENTION

The invention will now be described with reference to exemplary embodiments thereof. In a preferred embodiment of the invention, a glass staple fiber containing non-woven pre-consolidated by a binder is disposed adjacent to one or more non-woven of synthetic fibers. The non-wovens are bounded by hydro-dynamically needling at a water beam pressure in a range of 100 to 400 bar to produce a carrier of bounded non-wovens.

The non-woven of synthetic material can be staple fibers, but preferably filamentous fibers. These filamentous fibers are also known to those skilled in the art as "endless" or continuous fibers. The staple fibers or filaments may be present as multi-component fibers, in particular as bico fibers which are well known in the art. Suitable fiber materials can be selected from a group of polymers or copolymers such as polyester, poly(ethylene terephthalate), polypropylene, polyamides or polyolefins. Preferably, polypropylene and more preferably poly(ethylene terephthalate) are employed. In an exemplary embodiment, the synthetic non-wovens can be pre-consolidated mechanically, hydro dynamically, thermally or by calendering at temperatures where the synthetic fibers would shrink in totality. Further, the synthetic non-woven can be shrunk before bonding with the glass non-woven layer, prior or after pre-consolidation, but before bonding with the glass fiber non-woven.

The laminate is preferably needled at a water beam pressure of 200 to 300 bar and an energy of the water jets of 0.05 to 10 kwh/kg laminate. Advantageously, the synthetic organic filament non-woven utilized has a weight per unit area of 50 to 250 g/m$^2$ and has a filament titers of 1 to 8 dtex, preferably 1.5 to 4 dtex. It will readily be recognized by those skilled in the art that dtex or tex is a unit of measurement of g/10,000 m or g/1,000 m, respectively.

In the exemplary embodiment, the glass non-woven of staple fibers is pre-consolidated with a binder prior to bonding to the synthetic non-woven by needling. The glass fibers have a weight per unit are of about 30 to 150 g/m$^2$. The diameter of the glass fibers is about 8 to 16 μm, and preferably about 10 to 13 μm. The length of the fibers is about 8 to 32 mm, and preferably 8 to 18 mm. Suitable binder include water insoluble binders such as acrylate polymerized preferably with vinyl-acetate or styrene, urea formaldehyde, melamine formaldehyde, phenolic, epoxy, vinyl acetate, polyvinyl chloride, vinyl alcohol, acrylate and other thermoplastic and thermosetting resin.

The non-woven of glass fiber is produced in accordance to a so-called wet process to align the fibers in a more parallel fashion. Fibers of the E class, C class, mixtures thereof, and ECR glass are pre-consolidated with acrylic, urea-formaldehyde or melamine formaldehyde binders. Wet setting is performed, and a coating ranging from about 5 to 45 percent, and preferably from about 10 to 30 percent is applied. In the alternative, a so-called dry process can used where a more random orientation of the staples is attained. It will readily be recognized by the skilled artisan that up to 40 percent of the glass fibers can be substituted by other fibers. In particular, cellulose based fibers, polyacrylonitrile, polyester, polyamide, etc.

The non-woven layer of glass fibers may include a reinforcement in the form of staple fiber yarns, multifilament yarns, monofils or threads of glass, or other synthetic materials, such as high tenacity polyethylene, aramide, polyester disposed in the longitudinal direction and other reinforcing materials in the form of scrims. Scrims as used herein, includes laid layers of filaments, as well as woven filaments. The reinforcing filaments, yarns or scrims can also be disposed at any angle to the longitudinal or cross direction (e.g., 10 to 30 degrees). In addition, the reinforcement materials may be disposed between or in other layers. The reinforcements are placed from about 1 to 35 mm apart. The titre of the treads are about 200 to 1500 dtex, and preferably about 300 to 700 dtex.

Naturally, the bounded non-woven upon consolidation by needling can be utilized as carrier for the production of roofing felts, wall and floor coverings. To arrive at the roofing felt, for example, a secondary operation is conducted where the carrier is bituminized.

In accordance with another exemplary embodiment, a carrier web having two or more layers (i.e., sandwich structure) is manufactured. The organic synthetic non-woven is preferably made of polyester filaments by the spunbond method described in DE-OS 24 60 744 and herein incorporated in its entirety. Preferably, the synthetic employed is a poly(ethylene terephtalate) or a copolyester. The synthetic non-woven filament is pre-consolidated mechanically, hydro-dynamically or by heat treatment. Other pre-consolidation methods, such as with the aid of a calender or merely thermofixing in a hot oven or in an IR field are contemplated by the inventors and are within the scope of the invention.

In a three layer embodiment, the pre-fabricated glass fiber non-woven is placed between two polyester non-wovens and the three layers are hydro-dynamically needled together at an elevated water jet pressure. Naturally, a two-layer composite, wherein a polyester non-woven is placed on a pre-fabricated glass fiber non-woven, and treated accordingly.

In a further exemplary embodiment of the invention, the glass non-woven mat is introduced during the production of the polyester non-woven. For example, several spin beams form two or more curtains of spunbond synthetic materials which are deposited on a conveyor. Thereupon, glass staple fiber non-woven is deposited on the endless synthetic filament layers. Thereafter, additional curtains are continuously placed on the non-woven already deposited. The non-wovens are hydraulically needled using an elevated water pressure and may be additionally thermally treated after the needling, but preferably before needling.

The needled composite may then be treated with a binder, to perform an additional consolidation (i.e., end consolidation). However, the advantage of the invention is that the employment of a binder for the final consolidation may be completely omitted or at least can be avoided to a very high degree. Thus, the portion of the binder for the final consolidation may be in a range of 0 to 25 weight-percent, preferably less than 7.5, even more preferably less than 5 weight-percent.

In order to obtain a desired final thickness of the laminate the needled laminate/composite can be compressed by treatment with a commercially available calender, a fabric/belt or laminate calender.

The synthetic fibers may be thermally treated between temperature of about 140 to 220° C. Consequently, a subsequent treatment of the laminate does not generate additional shrinkage of the fibers of the non-wovens.

The synthetic fibers may be shrunk separately, and therefore before a non-woven is produced using these shrunken fibers. Preferably the organic fibers are shrunk when they are present in the form of a non-woven or in the form of corresponding layers. The shrinking may take place before a mechanical or hydro-dynamical pre-consolidation. Optionally, the non-woven is shrunk after a corresponding pre-consolidation. The shrinking is preferably performed by heating in an oven at temperature of about 140 to 220° C.

Additionally, shrinking can also be performed after the carrier non-woven has been bounded hydro-dynamically. The carrier, however is shrunk prior to bituminizing or coating with materials such as bitumen or other synthetics such as PVC, and modified polyolefins. Thus, to produce a roofing felt the carrier is led through a hot liquid bitumen bath.

In the manufacturing of wall and floor covering, carriers of two layers, as discussed above, are produced. The glass fiber non-woven is coated usually with one or more coating layers. PVC which may contain the usual additives is preferred as a coating material. However, all widely used coating materials that are commercially available may be employed.

The manufactured carriers are particularly useful in the manufacturing of bituminized roofing webs with outstanding mechanical stability. For example, the so-called banana curving is extremely small. Furthermore, the manufacturing process according to the invention largely reduces the risk of damages of the glass non-wovens. The product which is not finally consolidated by a binder shows a very good behavior in fire. Waves do not form on the carrier during a subsequent heat treatment which is particularly advantageous in case of a later bituminizing step. The roofing webs can be worked on the roof even in very unfavorable conditions.

An added advantage of the bituminized roofing webs produced is the perforation stability. The tear bridging is excellent and tears do not form on the roofing webs at most in a negligible manner.

A special advantage of the invention is the fact that it is possible to reduce the amount of binder during the production process or to omit the binder completely. Thus, the process can be carried out at a low cost. In addition, the invention presents a special benefit to the environment and the final product exhibits very good fire retardant properties.

Another surprising effect according to the invention is that the manufacturer may combine heavier glass non-wovens with lighter organic fiber non-wovens, particularly lighter polyester filaments non-wovens. Accordingly, the fire retardant properties which are of great importance to roofing felts and roofing membranes is improved.

Furthermore, in accordance with the invention it is possible for instance to produce a two layer composite which has at its glass fiber surface, (i.e., at the surface opposite to the polyester non-woven), a thin layer or fluff of organic fibers which have penetrated the glass fiber non-woven, resulting in a good adhesion of coatings and impregnation materials.

The formed laminate's thickness can be adjusted through the hydrodynamic needling method, or optionally through a secondary operation such as compression performed by a calender, a fabric belt or a laminate calender.

Furthermore, the product manufactured by the process outlined above provides dimensional stability and eliminates neck-down during coating or saturation by bitumen or PVC.

The invention will be further explained by the example provided below, wherein the laminate is consolidated by hydrodynamic bonding of the layers.

EXAMPLE

A glass staple fiber non-woven having an area weight of 80 g/m² is pre-consolidated by a urea resin binder and needled together with a polyester filament non-woven (area weight 80 g/m², linear filament density 2 dtex) at a water jet pressure of 250 bar and a line speed of 25 m/min.

The composite has a working strength (glass) of 246 N/5 cm and a maximum tensile strength (PES) of 410 N/5 cm at an elongation of 45%.

While the invention has been described in detail with reference to specific embodiments thereof, it will be apparent to those skilled in the art that various changes and modifications can be made, and equivalents employed, without departing from the scope of the claims that follow.

What is claimed is:

1. A method for the production of bounded non-woven carriers in the form of a laminate which comprises a plurality of layers, comprising the steps of;

providing a non-woven containing glass staple fiber which is pre-consolidated with a binder;

placing said non-woven containing glass staple fiber adjacent to one or more non-wovens of synthetic fibers, and hydro-dynamically needling said adjacent non-wovens at a water beam pressure in the range of about 100 to 400 bar to form said laminate.

2. The method according to claim 1, wherein said synthetic fibers are selected from the group consisting of polypropylene, polyester, polyamide, and polyolefin fibers.

3. The method according to claim 1, wherein said synthetic fibers are organic.

4. The method according to claim 1, wherein said synthetic fibers are continuous filaments or staple fibers.

5. The method according to claim 3, further comprising heat shrinking said organic fibers.

6. The method according to claim 1, wherein said needling takes place at a water beam pressure of 200 to 300 bar.

7. The method according to claim 1, wherein said non-woven of synthetic fibers has a weight per unit area of about 50 to 250 g/m² and the synthetic fibers have a titer of 1 to 8 dtex.

8. The method according to claim 1, wherein said non-woven of synthetic fibers has a weight per unit area of about 50 to 250 g/m² and the synthetic fibers have a titer of 1.5 to 4 dtex.

9. The method according to claim 1, wherein said non-woven containing glass staple fibers has a weight per unit area of 30 to 150 g/m², the glass fibers have a diameter of 8 to 16 mm and a staple length of 8 to 32 mm.

10. The method according to claim 1, wherein said non-woven containing glass staple fibers has a weight per unit area of 50 to 80 g/m², the glass fibers have a diameter 10 to 13 mm and a staple length of 8 to 18 mm.

11. The method according to claim 1, wherein said non-woven containing glass fibers is pre-consolidated with a water insoluble binder.

12. The method according to claim 11, wherein said water insoluble binder is an acrylate copolymerised with vinyl-acetate or styrene.

13. The method according to claim 11, wherein said water insoluble binder is selected from the group consisting of urea, melamine formaldehyde, phenolic, epoxy, vinyl acetate, polyvinyl chloride, vinyl alcohol, melamine and urea resin binders.

14. The method according to claim 1, wherein the bounded non-wovens are not subjected to a final consolidation by a binder after the needling.

15. The method according to claim 1, wherein the needling is performed in such a way that a part of the synthetic fibers pass through the non-woven of the glass fibers and any non-woven of synthetic fibers disposed beneath the non-woven of glass fibers to form said bounded non-woven carrier having an upper surface and a lower surface wherein a part of the synthetic fibers emerges at said lower surface and is adjacent to said lower surface as a result of said needling.

16. Carrier of bounded non-wovens processed by the method of claim 1.

17. The method according to claim 1 wherein a reinforcement is added to said laminate within or between said non-woven layers.

18. The method according to claim 1, wherein said synthetic fibers are poly(ethylene terephthalate) fibers.

* * * * *